Nov. 18, 1958     D. K. ELWELL     2,861,250

PIN PROTECTOR GAUGE

Filed May 31, 1955

INVENTOR
DAVID K. ELWELL
BY
Norman J. O'Malley
ATTORNEY

United States Patent Office 2,861,250
Patented Nov. 18, 1958

2,861,250
PIN PROTECTOR GAUGE

David K. Elwell, Doylestown, Pa., assignor to Sylvania Electric Products Inc., a corporation of Massachusetts Application May 31, 1955, Serial No. 512,002

4 Claims. (Cl. 339—36)

This invention relates to a pin protector gauge for electrical devices and more particularly to a device for gauging and protecting the base pins of an electron tube.

Gauges for determining the correct orientation of base pins for an electrical device such as an electron tube generally comprise a metal disc having apertures therein disposed and orientated in accordance with established standards for the pin positions. It is not conventional to provide any means for protecting the pins from becoming bent during the handling operations other than the usual cardboard boxes or compartments which enclose the entire tube. In large electrical devices, such as television picture tubes, difficulty is experienced in manipulating these tubes, and, as a result of handling, base pins become bent. These bent pins have become an increasing problem on the television production line.

It is therefore an object of this invention to provide a gauge for electrical device base pins which is adaptable for easy application to the pins.

A further object is the provision of a device for protecting the base pins of an electrical apparatus.

A still further object is the provision of a single structure adaptable for gauging and protecting the base pins of an electrical device.

The aforementioned objects, in addition to other objects which will be apparent upon reading the following description, are achieved in one aspect of the invention by the provision of a pin protector gauge or cap which fits over the electrical device base. Integral pedestals having wells therein are arranged inside the base for gauging the pin positions and for enclosing and protecting the pins of acceptable units.

For a better understanding of the invention, together with other and further objects, advantages and capabilities thereof, reference is made to the following description and appended claims in connection with the accompanying drawings in which:

Figure 1:
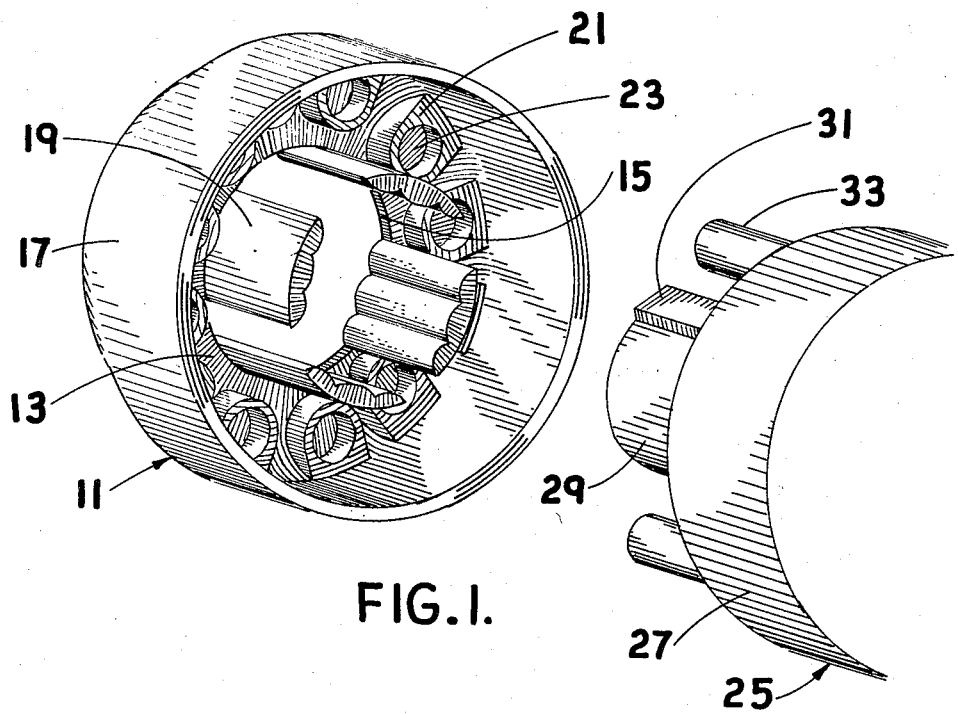
Figure 1 is a perspective view of an embodiment of the invention showing a pin protector gauge and an electrical base in a projected relationship.

Referring to Figure 1, pin protector gauge 11 is shown as a single molded piece of material such as a light weight plastic. A circular base 13 has an internal surface 15 defining a circular aperture in the central region of the base, and an external peripheral wall 17 extending from the base along the longitudinal axis of pin protector gauge 11. Four resilient studs 19, which may be grooved, are arranged around internal surface 15 at equally spaced positions and extend from base 13 concentrically with wall 17. Disposed intermediate studs 19 and wall 17 are a plurality of pedestals 21 having openings or shallow wells 23 formed therein. The inside surface of base 13 serves as the bottom of wells 23.

An electrical device 25 is shown in Figure 1 projected from its cooperating position with pin protector gauge 11. A conventional base 27 of the electrical device has a guide 29 with an integral key 31, and a plurality of pins or connectors 33 attached thereto. Studs 19 are shaped so that their edges abut the surface of guide 29 as key 31 meshes with the edges of the studs and pins 33 engage wells 23 as pin protector gauge 11 is slid onto base 25. The four studs 19 and pedestals 21 are arranged so that pin protector gauge 11 may be applied easily and quickly to base 27. The gauge need only be turned until key 31 slides between any two of the studs, and pins 33 will be in position for insertion into cooperating wells 23.

Figures 2, 3:
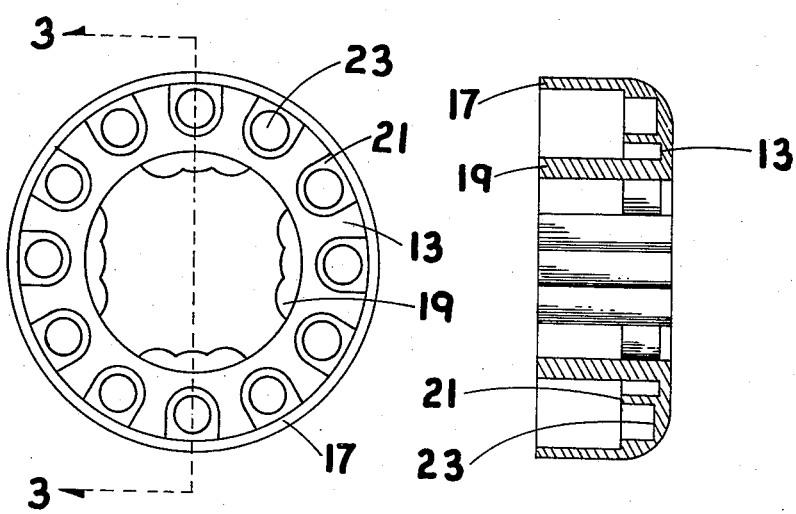
Figure 2 is a plan view of the pin protector gauge.
Figure 3 is a view taken along line 3—3 of Figure 2.

Figures 2 and 3 show more clearly the orientation of studs 19 and pedestals 21. Since the pedestals are spaced and disposed according to established standards for the base pin positions, pin protector gauge 11 serves as a go, no-go gauge. Bases having bent pins will not slide into cooperating relationship with the gauge. A pin protector gauge of the type shown is placed on each acceptable electrical device base to protect the base pins and guide during production handling operations. Tubes which will not receive the gauge are rejected.

Figure 3 shows that the bottom of wells 23 are formed by the internal surface of base 13. Therefore, the ends of pins 33 are completely enclosed and protected from becoming bent or otherwise malformed when protector 11 is in position.

Pin protector gauges made in accordance with this invention are easy to construct, and serve as a convenient and effective means for gauging the connector pin positions of an electrical device and for protecting these pins during packing, storing, and transit operations. In addition, previous difficulties in the assembly process where the electrical device or television picture tube is mounted on the television chassis are reduced, since the pin protector gauge serves to protect the deflection yokes from damage by the base pins as the picture tube is threaded through the yokes.

While there has been shown and described what at present is considered the preferred embodiment of the invention, it will be obvious to those skilled in the art that various changes and modifications may be made therein without departing from the scope of the invention as defined by the appended claims.

What is claimed:

1. A pin protector gauge for an electrical device having circular connector pins comprising a base with an integral external wall extending therefrom, and a plurality of pedestals arranged on the base adjacent said wall, each pedestal being formed to provide a circular shallow well for receiving the connector pins the diameter of said well being substantially equal to the diameter of the received pin.

2. A pin protector gauge for an electrical device having a centrally located guide lug and a plurality of pins arranged about said guide lug, said protector gauge comprising a base portion, centrally disposed resilient studs upstanding from said base portion for contacting and protecting said guide lug, and a plurality of pedestals peripherally arranged on said base portion formed to provide openings for gauging and receiving said pins.

3. A pin protector gauge for an electrical device having a centrally located guide lug and a plurality of pins arranged about said guide lug, said protector gauge comprising a base portion, centrally disposed resilient studs upstanding from said base portion for contacting and protecting said guide lug, and a plurality of pedestals peripherally disposed on said base to provide circular wells for gauging and receiving said pins.

4. A device for gauging and protecting an electrical connector having a centrally located guide lug and a plurality of circular pins arranged about said guide lug, said device comprising a base portion having an integral external wall formed to surround said pins, an internal surface on said base portion defining an aperture, a plurality of equally spaced resilient studs upstanding from said internal surface for contacting and protecting said guide lug, and a plurality of pedestals formed to provide circular shallow wells having a diameter substantially equal to the diameter of said circular pins for gauging and receiving said pins.

References Cited in the file of this patent

UNITED STATES PATENTS

| | | |
|---|---|---|
| 2,284,151 | Kingston | May 26, 1942 |
| 2,297,449 | Baumbach | Sept. 29, 1942 |
| 2,385,340 | Baxter | Sept. 25, 1945 |
| 2,514,562 | Stickney | July 11, 1950 |